Patented Mar. 16, 1937

2,074,181

UNITED STATES PATENT OFFICE 2,074,181

BENZANTHRONE DERIVATIVES

Isidor Morris Heilbron, Manchester, England, and Francis Irving, Grangemouth, Scotland, assignors to Imperial Chemical Industries Limited, a corporation of Great Britain No Drawing. Application November 20, 1935, Serial No. 50,797. In Great Britain November 20, 1934

6 Claims. (Cl. 260—61)

According to this invention we make benzanthrone derivatives by condensing anthrone which may be substituted by halogen with 1, 2, 3, 3-tetrachloropropylene in the presence of an acid condensing agent. Sulfuric acid is a suitable acid condensing agent. Anthrone and its halogen substituted derivatives may be replaced by the desmotropic anthranol or its halogen substituted derivatives.

Our invention also includes the following new compounds, namely dihalogen-Bz2-chlorobenzanthrones.

It also includes the following new compounds, namely, 2, 6, 11-trichlorobenzanthrone and 2,8, 11-trichlorobenzanthrone.

The following examples in which parts are by weight illustrate but do not limit the invention.

Example 1.—A mixture of 72 parts of 1, 2, 3, 3-tetrachloropropylene (Prins., J. prakt. Chem., 1914, 89, 414) and 870 parts of 96% sulfuric acid is stirred and warmed to 35° C. whilst 78 parts of anthrone are added. Hydrogen chloride is evolved and the mixture becomes deep red in color. Sstirring is continued at 40° C. for 16 hours and for a further 8 hours at 50° C. The reaction mixture is poured into water, filtered and the solid material freed from alkali-soluble matter by extracting with dilute caustic soda, again filtered, washed, dried and recrystallized from benzene or toluene. Greenish-yellow needles of Bz2-chlorobenzanthrone are obtained. This melts at 192° C. and dissolves in 96% sulfuric acid with a reddish-orange color.

The numbering of the benzanthrone ring adopted throughout this specification is that used by the Chemical Society, viz:—

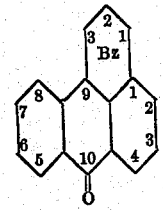

Example 2.—80 parts of 1, 2, 3, 3-tetrachloropropylene are added to a solution of 100 parts of 4-chloro-10-anthrone (Barnett and Matthews, J. Chem. Soc., 1923, 123, 2553) in 1300 parts of 96% sulfuric acid, and the mixture is heated at 35-40° C. for 16 hours. Hydrogen chloride is evolved and the solution becomes deep orange-red in color. The mixture is then heated for 6 hours at 45° C., the solution is poured on to ice-water, filtered, washed and dried. The product is recrystallized from benzene. Two new compounds are obtained viz:—

(a) A less soluble compound which is in the form of light yellowish-green needles, m. p. 176° C., which dissolves in concentrated sulfuric acid to an orange-red solution with a yellow fluorescence. This compound is probably 4-Bz2-dichlorobenzanthrone.

(b) A more soluble compound, which is in the form of dark green needles, m. p. 240° C. which dissolve in concentrated sulfuric acid to an orange-red solution with a yellow fluorescence. This compound is probably 5-Bz2-dichlorobenzanthrone.

Example 3.—25 parts of 1,5-dichloroanthrone (Barnett and Matthews, loc. cit.), 290 parts of 96% sulfuric acid and 18 parts of 1, 2, 3, 3-tetrachloropropylene are treated as described in Example 2. A compound which is probably the new 4, 8-Bz2-trichlorobenzanthrone is obtained. The product crystallizes from benzene or xylene in light yellow crystals, m. p. 190–191° C. which dissolve in 96% sulfuric acid with a deep red color and a brown fluorescence.

Example 4.—32 parts of 1, 4-dichloroanthrone (Barnett and Wiltshire, Ber., 1929, 62, 1971) 25 parts of 1, 2, 3, 3-tetrachloropropylene and 400 parts of 96% sulfuric acid are heated as described in Example 2. A brown crude product is obtained. This is boiled with alcohol, filtered and the solid matter crystallized from benzene. It then forms golden-yellow needles, m. p. 180–181° C., which dissolve in 96% sulfuric acid with an intense red color and a brown fluorescence. A compound which is probably the new 5, 8-Bz2-trichlorobenzanthrone is obtained.

We claim

1. Dihalogen-Bz2-chlorobenzanthrones.
2. 4, 8-Bz2-trichlorobenzanthrone.
3. 5, 8-Bz2-trichlorobenzanthrone.
4. The process for the production of benzanthrone derivatives which comprises condensing a compound of the class consisting of anthrone and its halogen derivatives with 1, 2, 3, 3-tetrachloropropylene in the presence of an acid condensing agent.
5. The process as claimed in claim 4 in which the acid condensing agent is sulfuric acid.
6. The process for the manufacture of Bz2-chlorobenzanthrone which comprises condensing anthrone with 1, 2, 3, 3-tetrachloropropylene in the presence of sulfuric acid.

ISIDOR MORRIS HEILBRON.
FRANCIS IRVING.